(12) United States Patent
Liu et al.

(10) Patent No.: US 10,182,411 B2
(45) Date of Patent: Jan. 15, 2019

(54) METHOD AND ACCESS POINT FOR IMPLEMENTING TIMING SYNCHRONIZATION IN A RADIO COMMUNICATION NETWORK

(71) Applicant: Telefonaktiebolaget LM Ericsson (publ), Stockholm (SE)

(72) Inventors: Jinhua Liu, Beijing (CN); Zhan Zhang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 156 days.

(21) Appl. No.: 15/109,368

(22) PCT Filed: Jan. 6, 2014

(86) PCT No.: PCT/CN2014/070145
§ 371 (c)(1),
(2) Date: Jun. 30, 2016

(87) PCT Pub. No.: WO2015/100740
PCT Pub. Date: Jul. 9, 2015

(65) Prior Publication Data
US 2016/0330706 A1     Nov. 10, 2016

(51) Int. Cl.
*H04J 3/06*     (2006.01)
*H04W 56/00*     (2009.01)

(52) U.S. Cl.
CPC ....... *H04W 56/0015* (2013.01); *H04J 3/0652* (2013.01)

(58) Field of Classification Search
CPC ................ H04W 56/0015; H04J 3/0652
See application file for complete search history.

(56) References Cited

U.S. PATENT DOCUMENTS

| | | | |
|---|---|---|---|
| 5,613,211 A * | 3/1997 | Matsuno | H04B 7/2668 370/350 |
| 8,576,778 B2 | 11/2013 | Irvine | |

(Continued)

FOREIGN PATENT DOCUMENTS

| | | |
|---|---|---|
| CN | 101778467 A | 7/2010 |
| CN | 102625438 A | 8/2012 |

(Continued)

OTHER PUBLICATIONS

Supplementary European Search Report, Application No. EP 14876916, dated Aug. 7, 2017.

(Continued)

*Primary Examiner* — Maharishi V Khirodhar
(74) *Attorney, Agent, or Firm* — Patent Portfolio Builders, PLLC

(57) ABSTRACT

Disclosed are a method and an Access Point (AP) for implementing timing synchronization by one or more root timing reference APs in a radio communication network. Each of the one or more root timing reference APs selects an external timing reference source from existing networks that at least partially overlap with the radio communication network, derives a reference timing from the external timing reference source, and propagates the reference timing to neighboring APs in the radio communication network.

16 Claims, 3 Drawing Sheets

(56) References Cited

U.S. PATENT DOCUMENTS

| | | | |
|---|---|---|---|
| 2005/0135284 A1* | 6/2005 | Nanda | H04L 29/06068 370/294 |
| 2012/0195253 A1* | 8/2012 | Irvine | H04J 3/0641 370/328 |
| 2013/0010658 A1* | 1/2013 | Zhu | H04W 56/0015 370/280 |
| 2013/0122917 A1* | 5/2013 | Yavuz | H04J 3/0638 455/450 |
| 2014/0269645 A1* | 9/2014 | Do | H04W 56/0065 370/338 |
| 2015/0373654 A1* | 12/2015 | Yasukawa | H04W 56/00 370/338 |

FOREIGN PATENT DOCUMENTS

| | | | | |
|---|---|---|---|---|
| EP | 2451226 | | 5/2012 | |
| EP | 2451226 A1 * | | 5/2012 | ........ H04W 56/0015 |
| WO | 01/08344 | | 2/2001 | |
| WO | WO-0108344 A2 * | | 2/2001 | ............ H04B 7/269 |
| WO | WO 2009/099809 A2 | | 8/2009 | |
| WO | WO-2009099809 A2 * | | 8/2009 | ............ H04J 3/0641 |
| WO | WO 2011/063044 A1 | | 5/2011 | |

OTHER PUBLICATIONS

International Search Report and Written Opinion of the International Searching Authority, Application No. PCT/CN2014/070145, dated Oct. 10, 2014.

* cited by examiner

METHOD AND ACCESS POINT FOR IMPLEMENTING TIMING SYNCHRONIZATION IN A RADIO COMMUNICATION NETWORK

CROSS REFERENCE TO RELATED APPLICATION

This application is a 35 U.S.C. § 371 national stage application of PCT International Application No. PCT/CN2014/070145, filed on Jan. 6, 2014, the disclosure and content of which is incorporated by reference herein in its entirety. The above-referenced PCT International Application was published in the English language as International Publication No. WO 2015/100740 A1 on Jul. 9, 2015.

TECHNICAL FIELD

The present technology relates to the field of radio communication, particularly to a method for implementing timing synchronization in a radio communication network. The technology also relates to an access point, a computer program and a storage medium.

BACKGROUND

In a radio communication network such as an Ultra Dense Network (UDN), a large number of communication nodes are deployed super densely. Hence, UDN nodes have to be of low cost and easy to be deployed. Synchronization is a leverage to simplify the design of network and device. The UDN nodes should be synchronized to meet complexity and cost control targets.

In addition, a typical deployment for UDN is in highly populated areas such as hot spots, office building, or downtown area at cities, where there are demands of high data rate service. Currently, data traffic is boosting rapidly while there is a clear bandwidth limit in low frequency bands. Hence, it is necessary for UDN to utilize a higher carrier frequency and a wider bandwidth in order to reach an even higher data rate. In order to have a high flexibility and low cost of deployment, wireless backhaul may be necessary for some access points (APs), but these UDN APs cannot obtain synchronization signal via wired networks. Furthermore, in order to reach high data rate, dynamic frequency division and allocation of radio resources are needed for neighboring UDN APs. In order to keep a frequency offset as small as possible between neighboring APs, an efficient time and frequency synchronization scheme is necessary. Therefore, it is desirable to provide an efficient synchronization method for the UDN.

Typically, the radio communication networks, such as Time Division Long Term Evolution (TD-LTE), Time Division-Synchronization Code Division Multiple Access (TD-SCDMA) and Code Division Multiple Access (CDMA) 2000, rely on Global Positioning System (GPS) to synchronize the whole network. In particular, each Base Station (BS) refers to a GPS reference timing signal to adjust its local timing. By doing so, the whole network can be synchronized to a satisfactory degree of accuracy in a sense that the remaining timing mismatch between neighboring BSs can be accommodated and solved by cyclic prefix of signals.

However, the existing method doesn't provide a straightforwardly valid means for the timing synchronization in the UDN. Adding GPS antenna and receiver to every UDN AP is not feasible for cost control reason. Also, most of UDN APs are deployed indoors. On the other hand, wireless backhaul requirement for some UDN APs rules out using wired line network to obtain synchronization reference.

SUMMARY

A first aspect of present disclosure is a method for implementing timing synchronization by one or more root timing reference APs in a radio communication network. The method comprises that each of the one or more root timing reference APs performs the following steps: selecting an external timing reference source from existing networks that at least partially overlap with the radio communication network; deriving a reference timing from the external timing reference source; and propagating the reference timing to neighboring APs in the radio communication network.

A second aspect of the present disclosure is a method for implementing timing synchronization by one or more non-root timing AP in a radio communication network. The method comprises that each of the one or more non-root timing reference APs performs the following steps: deriving reference timings from one or more root timing reference APs in the radio communication network, wherein the one or more root timing reference APs derive reference timings from external timing reference sources; and determining a local timing based on the reference timings.

A third aspect of the present disclosure is a root timing reference AP. The root timing reference AP is configured to implement timing synchronization in a radio communication network. It comprises a selecting unit, a first deriving unit and a propagating unit. The selecting unit is adapted to select an external timing reference source from existing networks that at least partially overlap with the radio communication network. The first deriving unit is adapted to derive reference timing from the external timing reference source. The propagating unit is adapted to propagate the reference timing to neighboring APs in the radio communication network.

A fourth aspect of the present disclosure is computer readable storage medium which stores instructions which, when run on a root timing AP, cause the root timing reference AP to perform the steps of the method described above.

A fifth aspect of the present disclosure is a non-root timing reference AP, which is configured to implement timing synchronization in a radio communication network. The non-root timing reference AP comprises a second deriving unit and a determining unit. The second deriving unit is adapted to derive reference timings from one or more root timing reference APs in the radio communication network, the one or more root timing reference APs derive reference timings from external timing reference sources. The determining unit is adapted to determine a local timing based on the reference timings.

A sixth aspect of the present disclosure is a computer readable storage medium which stores instructions which, when run on non-root timing reference AP, cause the non-root timing reference AP to perform the steps of the method described above.

A seventh aspect of the present disclosure is a root timing reference AP which is configured to implement timing synchronization in a radio communication network. The root timing reference AP comprises a processor and a memory. The memory contains instructions executable by the processor, whereby the root timing reference AP is operative to select an external timing reference source from existing networks that at least partially overlap with the radio communication network; derive reference timing from the external timing reference source; and propagate the reference timing to neighboring APs in the radio communication network.

An eighth aspect of the present disclosure is a non-root timing reference AP which is configured to implement timing synchronization in a radio communication network. The non-root timing reference AP comprises a processor and a memory. The memory contains instructions executable by the processor, whereby the non-root timing reference AP is operative to derive reference timings from one or more root timing reference APs in the radio communication network, the one or more root timing reference APs derive reference timings from external timing reference sources; and determine a local timing based on the reference timings.

By utilizing the existing networks overlapping with the radio communication as external timing reference source, the root timing reference APs in the radio communication network derives the reference timing from the external timing reference source, and propagates the reference timing to neighboring APs in the radio communication network. As such, all the APs have chance to obtain the reference timing, thereby timing synchronization can be accomplished. In comparison with the existing GPS synchronization scheme, this method doesn't require that all the APs are able to derive the reference timing from the external timing reference source, thereby saving the deployment cost of the APs in the radio communication network

BRIEF DESCRIPTION OF THE DRAWINGS

The technology will now be described, by way of example, based on embodiments with reference to the accompanying drawings, wherein.

DETAILED DESCRIPTION

Figure 1:
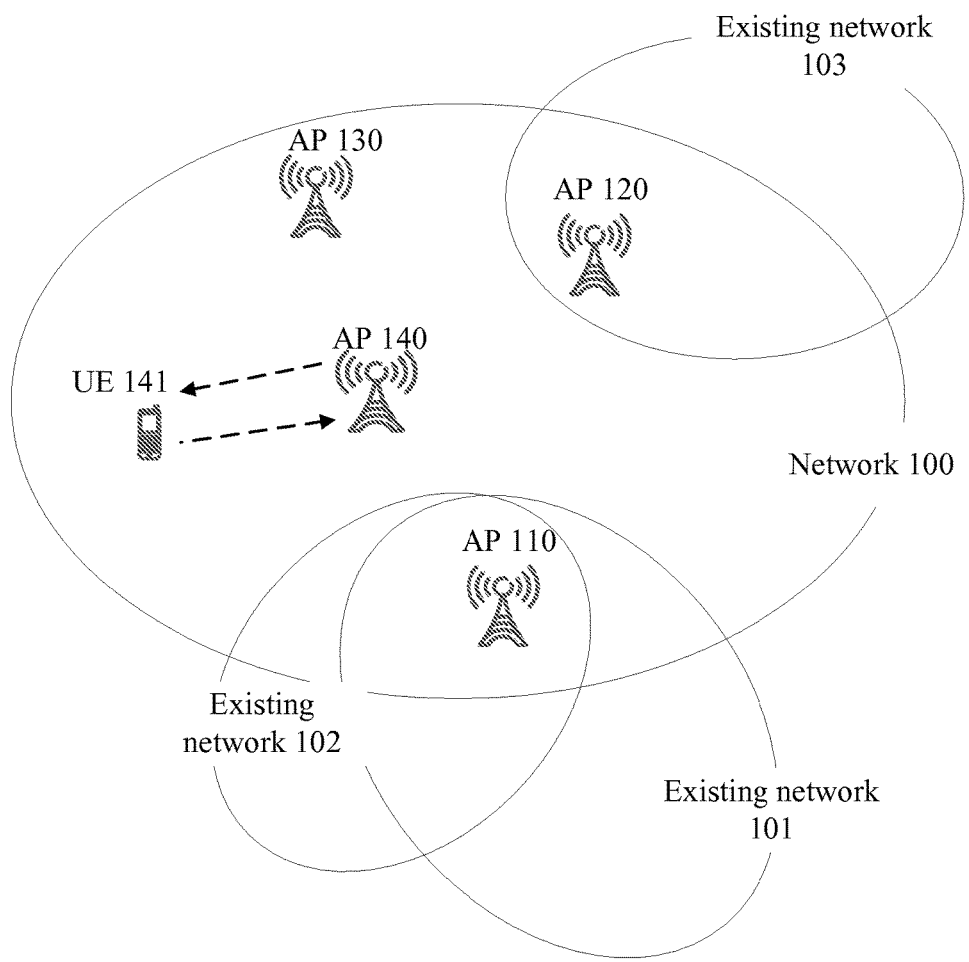
FIG. 1 illustrates a schematic view of a radio communication network environment suitable to implement an embodiment of the present invention.

Embodiments herein will be described more fully hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program on a computer-usable or computer-readable storage medium having computer-usable or computer-readable program code embodied in the medium for use by or in connection with an instruction execution system. In the context of this document, a computer-usable or computer-readable storage medium may be any medium that may contain, store, or is adapted to communicate the program for use by or in connection with the instruction execution system, apparatus, or device.

Although specific terms in some specifications are used here, such as AP, it should be understand that the embodiments are not limited to those specific terms but may be applied to all similar entities, such as Base Station (BS), cell, sector, femto base station, Core Network (CN), NodeB, eNodeB, etc.

Embodiments herein will be described below with reference to the drawings.

FIG. 1 illustrates a schematic view of a radio communication network environment suitable to implement an embodiment of the present invention. As shown in FIG. 1, a radio communication network 100 includes APs 110-140. The AP 140 serves the UE 141. The radio communication network 100 overlaps with three existing network 101-103. Both the existing network 101 and 102 cover the AP 110. The existing network 103 covers the AP 120.

Here, the radio communication network 100 represents any wireless network requiring timing synchronization like the UDN. The existing networks 101-103 refers to the radio communication networks that at least partially overlap with the radio communication network 100 and are able to provide reference timing to the APs in the radio communication network 100, including but not limited to satellite system such as Global Position System (GPS), Beidou system, Galileo satellite navigation system (GSNS), radio communication network such as TD-LTE, CDMA 2000, TD-SCDMA.

For simplicity, only four APs are shown in the radio communication network 100. It should be appreciated that the radio communication network 100 may have one or more APs and each of the APs are capable of serving one or more UEs. In addition, it is possible that the radio communication network 100 may overlap with one or more existing networks in coverage.

Figure 2:
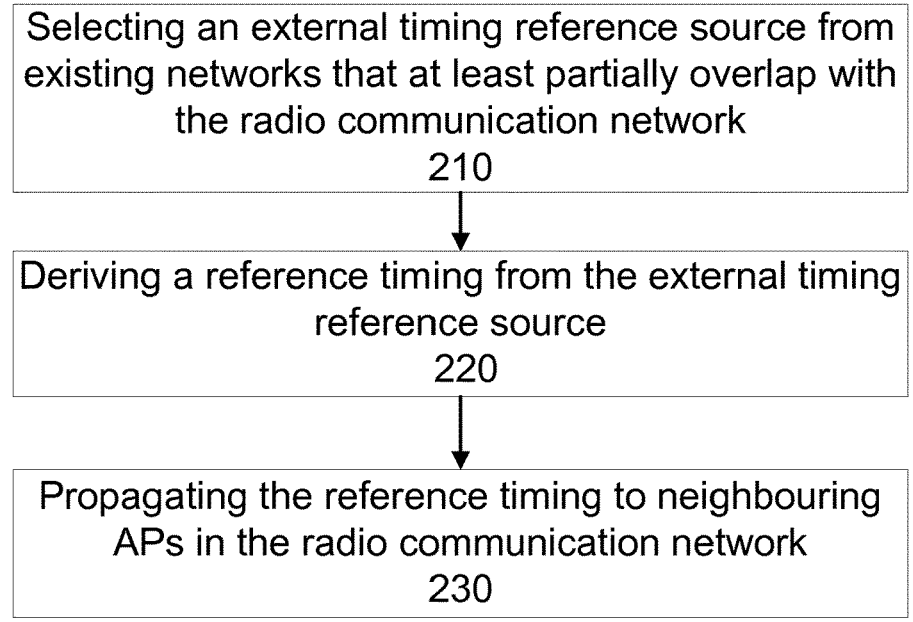
FIG. 2 schematically illustrates a flowchart of implementing timing synchronization by one or more root timing reference APs in accordance with an embodiment.

FIG. 2 schematically illustrates a flowchart of implementing timing synchronization by one or more root timing reference APs in accordance with an embodiment. Now the process of the embodiment will be described in detail with reference to FIG. 2 and FIG. 1.

The root timing reference AP refers to the AP that derives the reference timing from external timing reference source. In the present disclosure, the root timing reference AP will derive the reference timing from the existing network that at least partially overlap with the radio communication network to which the root timing reference AP belongs. In FIG. 1, the AP 110 and AP 120 are the root timing reference AP candidates, since they are located within the coverage of some existing networks. For example, the AP 120 is covered by the existing network 103, and the AP 110 is covered by the existing networks 101 and 102.

In an embodiment, it can be predetermined which APs in the radio communication network that will act as the root timing reference APs. For instance, the candidate APs having wired backhaul to Operations, Administration and Management (OAM) module or network core will be the root timing reference APs. Alternatively, an AP will act as the root timing reference AP as long as it is able to derive the reference timing from an external timing reference source. It is possible that one or more APs in the radio communication network will act as root timing reference AP. For illustration, both the APs 110 and 120 are taken as the root timing reference APs. Each of the APs 110 and 120 will perform the following operation:

In step 210, the root timing reference AP selects an external timing reference source from existing networks that at least partially overlap with the radio communication network. Specifically, the root timing reference AP will select the external timing reference source from the existing networks that cover the root timing reference AP. Since AP 120 is only covered by network 103, the network 103 will be the external timing reference source of the AP 120. The AP 110 is covered by the existing networks 101 and 102, hence the AP 110 needs determine which one will be its external timing reference source.

In an embodiment, the AP 120 may monitor the existing networks 101 and 102 to determine signal quality of signals transmitted from the existing networks, and select an existing network having higher signal quality than a quality threshold from the existing networks as the external timing reference source. In particular, the AP 120 may respectively receive the signals broadcast by the existing network 101 and 102 and evaluate the signal quality of the received signals. If any one of the existing networks has higher signal quality than the predetermined quality threshold, it will be taken as the external timing reference source. It should be understood that the means to evaluate signal quality is known in the art, which will not be described in detail for brevity.

In another embodiment, when more than one of the existing networks have higher signal quality than the quality threshold, the root timing reference AP may select an existing network with the highest preconfigured priority from the existing networks as the external timing reference source. The priority of the existing networks can be designated by the radio communication network 100 in advance and each of the APs in the network 100 can keep the network priority list. Alternatively, both the signal quality and the priority of the existing networks can be weighted to determine the external timing reference AP.

Alternatively, if one existing network is qualified as the external timing reference source, the root timing reference AP will not monitor the existing networks with the lower priority.

Alternatively, the root timing reference AP can just monitor the currently used external timing reference source and a backup external timing reference source.

Alternatively, the root timing reference AP can only monitor the currently used external timing reference source if the current external timing reference source is of the highest priority in the network priority list. It starts monitoring other candidate existing networks only when the currently used external timing reference source becomes degrading.

Alternatively, the external timing reference source can be dynamically configured by Operations, Administration and Management (OAM) module of the radio communication network 100. The root timing reference AP can directly select its external timing reference source according to the configuration.

Please note that all the root timing reference APs may select the same existing network as the external timing reference source. It is also possible that the external timing reference sources selected by the respective root timing reference APs are different from each other. For example, the AP 110 may select the existing network 101 as its external timing reference source, while the AP 120 may select the existing network 103 as the external timing reference source.

In step 220, the root timing reference AP derives a reference timing from the external timing reference source. Generally, the existing network acting as the external timing reference source broadcasts its synchronization beacon signal within its coverage. In this way, the root timing reference AP can receive such beacon signal and retrieve the reference timing from the signal.

It should be appreciated that the above process to derive the reference timing is described by way of example, and any other suitable ways to derive the reference timing are applicable to the present invention.

In step 230, the root timing reference AP propagates the reference timing to neighboring APs in the radio communication network. Specifically, the root timing reference AP may propagate the reference timing to the predetermined neighboring APs by its beacon signal. Alternatively, the root timing reference AP may propagate the reference timing arbitrarily. In this case, the root timing reference AP doesn't know the receiving APs.

In addition, in order to facilitate the receiving APs to synchronize with the reference timing, it is desirable that the root timing reference AP propagates priority information of the external timing reference source to neighboring APs along with the reference timing. The usage of the priority information on the receiving APs will be described in detail later.

As indicated, by utilizing the existing networks overlapping with the radio communication as external timing reference source, the root timing reference APs in the radio communication network derives the reference timing from the external timing reference source, and propagates the reference timing to neighboring APs in the radio communication network. As such, all the APs have chance to obtain the reference timing, thereby timing synchronization can be accomplished. In comparison with the existing GPS synchronization scheme, this method doesn't require that all the APs are able to derive the reference timing from the external timing reference source, thereby saving the deployment cost of the APs in the radio communication network.

Additionally or alternatively, before propagating the reference timing to neighboring APs in step 230, the root timing reference APs may determine their local timing based on the derived reference timing. In particular, if the root timing reference APs doesn't receive reference timings propagated from other root timing reference APs, it can directly take the reference timing derived by itself as its local timing.

Otherwise, when a first root timing reference AP of the root timing reference APs (e.g. AP 110) receives a reference timing from a second root timing reference AP of the root timing reference APs (e.g. AP 120), the AP 110 may compare a priority of an external timing reference source ES1 selected by the AP 110 with that of an external timing reference source ES2 selected by the AP 120. When the priority of the ES2 is higher than the priority of the ES1, the AP 110 determines a local timing based on the reference timing received from the AP 120 instead of the reference timing derived itself. In other words, the AP 110 may stop deriving the reference timing from ES1 and use the received reference timing to determine its local timing. In addition, the AP 110 begin to propagate the new local timing, determined based on the reference timing received from the AP 120, to neighboring APs in the radio communication network 100.

As can be seen, although the individual root timing reference APs may derive different reference timing from different external timing reference source, the propagation of the reference timings within the radio communication network tends to cause the root timing reference APs to synchronize with the reference timing originated from the external timing reference source with the highest priority. That is, they may finally synchronize with the same reference timing. In this way, the synchronization across the APs can be achieved.

Alternatively, in order to further guarantee the synchronization accuracy, when the AP 110 determines that the priority of the ES2 is higher than the priority of ES1, it may try to directly derive a further reference timing from the ES2. If the AP 110 can derive the further reference timing from ES2 successfully, the AP 110 may determine the local timing based on the further reference timing.

Figure 3:
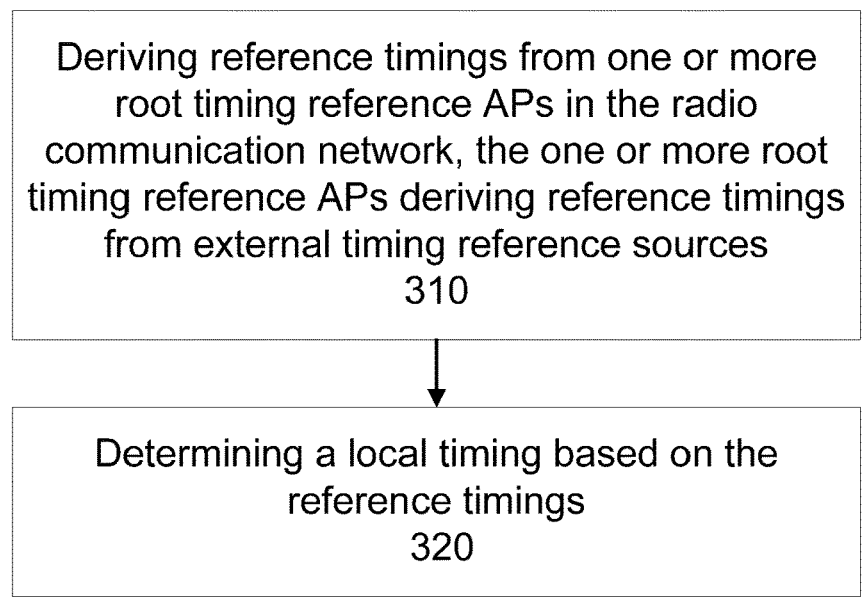
FIG. 3 schematically illustrates a flowchart of implementing timing synchronization by one or more non-root timing reference APs in accordance with an embodiment.

FIG. 3 schematically illustrates a flowchart of implementing timing synchronization by one or more non-root timing reference APs in accordance with an embodiment. Now the process of the embodiment will be described in detail with reference to FIG. 3 and FIG. 1.

All the APs other than the root timing reference APs in the radio communication network are referred to as the non-root timing reference APs. The APs that have no ability to directly derive the reference timing from the external timing reference source are surely the non-root timing reference APs. Some APs that have the ability to derive the reference timing from the external timing reference source may also act as the non-root timing reference APs. In short, the non-root timing reference AP derives the reference timing through the internal timing propagation. For simplicity, in the radio communication network 100, the AP 130 and 140 will act as the non-root timing reference APs. Each of the non-root timing reference APs will perform the following operation:

In step 310, the non-root timing reference AP derives reference timings from one or more root timing reference APs in the radio communication network. The one or more root timing reference APs derives reference timings from external timing reference sources as described above. When the root timing reference APs propagate the reference timings derived from the external reference sources, the non-root timing reference AP may derive at least one of the reference timings. In an embodiment, the root timing reference APs propagate an absolute timing reference, as such, the non-root timing reference AP may directly receive the absolute timing reference as the reference timing. In another embodiment, the root timing reference APs may propagate a timing reference implicitly via the transmission of a beacon signal or preamble, i.e. the transmitting timing of the beacon signal or preamble actually suggests the reference timing. In this case, after receiving the beacon signal or preamble, the non-root timing reference AP may derive the transmitting timing and evaluate the propagation delay based on the received beacon signal or preamble, whereby the reference timing can be obtained. Since such derivations of reference timing are well known in the art, they will not be described in further detail.

In step 320, the non-root timing reference AP determines a local timing based on the reference timings. In an embodiment, the non-root timing reference AP may calculate an average of the derived reference timing as its local timing. In another embodiment, the non-root timing reference AP may obtain signal quality or strength of beacon signals that carry the reference timing, and select a reference timing having the best signal quality or highest strength from the reference timings as its local timing. Here, the signal quality can be measured by the signal to noise ratio (SINR) or jitter of the beacon signals. The strength of the beacon signals can be measured by the received power level of the beacon signal.

Through utilizing the reference timing derived from the root timing reference APs to determine the local timing, the non-root timing reference APs can accomplish timing synchronization with the root timing reference APs. In this way, the timing synchronization can be achieved among all the APs in the radio communication network. Furthermore, all the UEs always synchronize with its associated APs. For example, the UE 141 may synchronize with the AP 140. As such, the timing synchronization can be implemented throughout the radio communication network 100.

Optionally, after deriving the reference timings from one or more root timing reference APs, the non-root timing reference AP may select one or more optimal reference timings from the reference timings according to propagation hops from the one or more root timing reference APs to the non-root timing reference AP.

Typically, the reference timing having the less number of propagation hops is preferred. For example, the reference timing derived by the AP 120 is propagated to the AP 130 directly. Hence the number of propagation hops from the AP 120 to the AP 130 is 1. Meanwhile, the reference timing derived by the AP 110 is propagated to the AP 130 through AP 140. As such, the number of propagation hops from the AP 110 to the AP 130 is 2. In this case, the reference timing derived by the AP 120 is preferred to the reference timing derived by the AP 110 in selecting the optimal reference timings. In an embodiment, the number of the propagation hops can be recorded in a synchronization flag, which is propagated together with the reference timing in the beacon signals. During propagation, whenever the reference timing arrives at a next AP, the number of the propagation hops will be incremented by one.

After selecting the optimal reference timings, the non-root timing reference APs may determine the local timing only based on the optimal reference timings. The determination process can be performed as described above.

Optionally, the non-root timing reference AP may derive both the reference timings and priority information of external timing reference sources providing the reference timings from the one or more root timing reference APs. In this case, the non-root timing reference AP may select the reference timings provided by the external timing reference sources having the highest priority as the optimal reference timings. Alternatively, the non-root timing reference AP may also select the optimal reference timings by taking both the propagation hops and the priority information of the external timing reference sources into account.

Optionally, in order to ensure that all the APs in the radio communication network have chance to synchronize with other APs. The non-root timing reference AP may propagate the determined local timing to neighboring APs in the radio communication network. The neighboring APs may include root timing reference APs and other non-root timing reference APs. Upon receiving the local timing originated from the non-root timing reference AP, the root timing reference APs are likely to simply ignore it, and other non-root timing reference APs may determine its local timing based on the received local timing in the case that the other non-root timing reference APs don't receive reference timing from any root timing reference APs.

Figure 4:
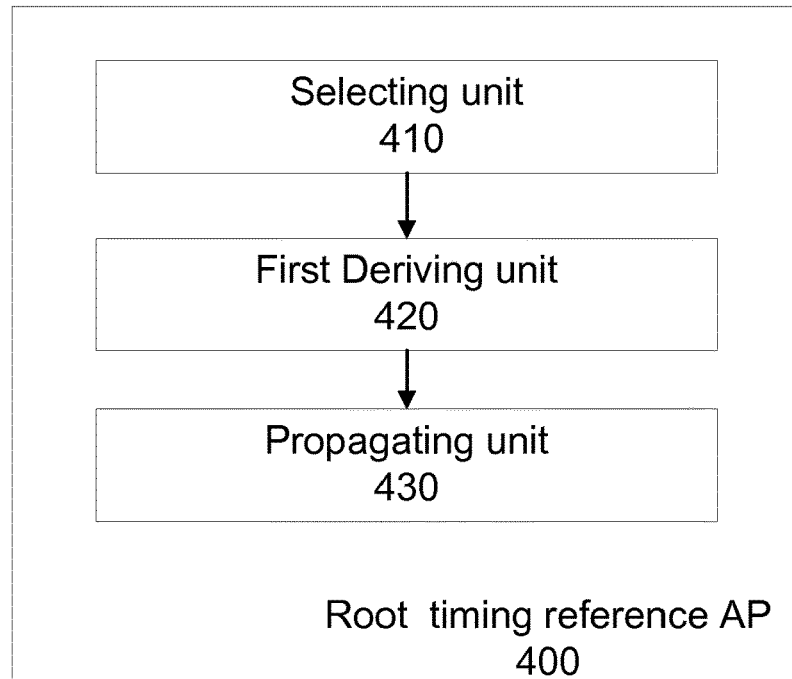
FIG. 4 illustrates a schematic view of a root timing reference AP in accordance with an embodiment.

FIG. 4 illustrates a schematic view of a root timing reference AP in accordance with an embodiment. As shown, the root timing reference AP 400 comprises a selecting unit 410, a first deriving unit 420 and a propagating unit 430. It should be appreciated that the root timing reference AP 400 is not limited to the shown elements, and can comprise other conventional elements and additional elements for other purposes. Here, the root timing reference AP 400 functions as the AP 110 or 120 in FIG. 1. Now the functions of the individual units will be described in detail with reference to the FIG. 4.

The selecting unit 410 of the root timing reference AP 400 selects an external timing reference source from existing networks that at least partially overlap with the radio communication network. Specifically, the selecting unit 410 will select the external timing reference source from the existing networks that cover the root timing reference AP.

In an embodiment, the selecting unit 410 may monitor the existing networks to determine signal quality of signals transmitted from the existing networks, and select an existing network having higher signal quality than a quality threshold from the existing networks as the external timing reference source. For example, if any one of the existing networks has higher signal quality than the predetermined quality threshold, it will be taken as the external timing reference source. It should be understood that the means to evaluate signal quality is known in the art, which will not be described in detail for brevity.

In another embodiment, when more than one of the existing networks has higher signal quality than the quality threshold, the selecting unit 410 may select an existing network with the highest preconfigured priority from the more than one of the existing networks as the external timing reference source. The priority of the existing networks can be designated by the radio communication network 100 in advance and each of the APs in the network 100 can keep the network priority list. Alternatively, both the signal quality and the priority of the existing networks can be weighted to determine the external timing reference AP.

Alternatively, if one existing network is qualified as the external timing reference source, the selecting unit 410 will not monitor the existing networks with the lower priority.

Alternatively, the selecting unit 410 can just monitor the currently used external timing reference source and a backup external timing reference source.

Alternatively, the selecting unit 410 can only monitor the currently used external timing reference source if the current external timing reference source is of the highest priority in the network priority list. It starts monitoring other candidate existing networks only when the currently used external timing reference source becomes degrading.

Alternatively, the external timing reference source can be dynamically configured by Operations, Administration and Management (OAM) module of the radio communication network 100. The selecting unit 410 can directly select its external timing reference source according to the configuration.

The first deriving unit 420 of the root timing reference AP 400 derives a reference timing from the external timing reference source. Generally, the existing network acting as the external timing reference source broadcasts its synchronization beacon signal within its coverage. In this way, the first deriving unit 420 can receive such beacon signal and retrieve the reference timing from the signal.

The propagating unit 430 of the root timing reference AP 400 propagates the reference timing to neighboring APs in the radio communication network. Specifically, the propagating unit 430 may propagate the reference timing to the predetermined neighboring APs by its beacon signal. Alternatively, the propagating unit 430 may propagate the reference timing arbitrarily. In this case, it doesn't know the receiving APs.

In addition, in order to facilitate the receiving APs to synchronize with the reference timing, it is desirable that the root timing reference AP propagates priority information of the external timing reference source to neighboring APs along with the reference timing. The usage of the priority information on the receiving APs will be described in detail later.

As indicated, by utilizing the existing networks overlapping with the radio communication as external timing reference source, the root timing reference APs in the radio communication network derives the reference timing from the external timing reference source, and propagates the reference timing to neighboring APs in the radio communication network. As such, all the APs have chance to obtain the reference timing, thereby timing synchronization can be accomplished. In comparison with the existing GPS synchronization scheme, this method doesn't require that all the APs are able to derive the reference timing from the external timing reference source, thereby saving the deployment cost of the APs in the radio communication network.

Additionally or alternatively, before propagating unit 430 propagates the reference timing to neighboring APs, the root timing reference AP 400 may determine its local timing based on the derived reference timing. In particular, if the root timing reference AP 400 doesn't receive reference timings propagated from other root timing reference APs, it can directly take the reference timing derived by itself as its local timing.

Otherwise, when the root timing reference AP 400 receives a reference timing from another root timing reference AP, the root timing reference AP 400 may compare a priority of an external timing reference source ES1 selected by the AP 400 with that of an external timing reference source ES2 selected by the another root timing reference AP.

When the priority of the ES2 is higher than the priority of the ES1, the root timing reference AP 400 determines a local timing based on the reference timing received from the another root timing reference AP. In other words, the root timing reference AP 400 may stop deriving the reference timing from ES1 and use the received reference timing from the said another root timing reference AP to determine its local timing. In addition, the root timing reference AP 400 may stop propagating the reference timing derived by itself, and begin to propagate the local timing, determined based on the reference timing received from the another root timing reference AP, to neighboring APs in the radio communication network 100.

As can be seen, although the individual root timing reference APs may derive different reference timing from different external timing reference sources, the propagation of the reference timings within the radio communication network tends to cause the root timing reference APs to synchronize with the reference timing originated from the external timing reference source with the highest priority. That is, they may finally synchronize with the same reference timing. In this way, the synchronization accuracy across the APs can be guaranteed.

Alternatively, in order to further guarantee the synchronization accuracy, when the root timing reference AP 400 determines that the priority of the ES2 is higher than the priority of ES1, it may try to directly derive a further reference timing from the ES2. If the first deriving unit 420 of root timing reference AP 400 can derive the further reference timing from ES2 successfully, the AP 110 may determine the local timing based on the further reference timing, instead of the reference timing received from the another root timing reference AP.

Figure 5:
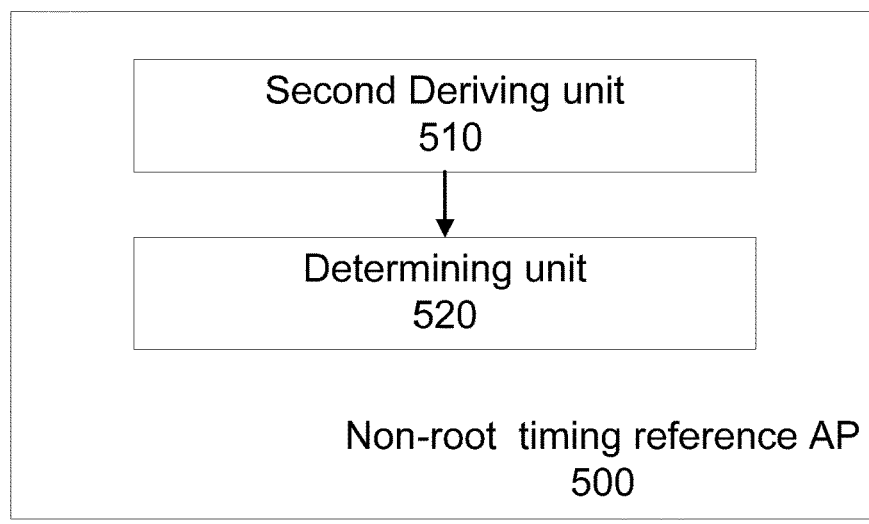
FIG. 5 illustrates a schematic view of a non-root timing reference AP in accordance with an embodiment.

FIG. 5 illustrates a schematic view of a non-root timing reference AP in accordance with an embodiment. As shown, the non-root timing reference AP 500 comprises a second deriving unit 510 and a determining unit 520. It should be appreciated that the non-root timing reference AP 500 is not limited to the shown elements, and can comprise other conventional elements and additional elements for other purposes. Here, the non-root timing reference AP 500 functions as the AP 130 or 140 in FIG. 1. Now the functions of the individual units will be described in detail with reference to the FIG. 5.

All the APs other than the root timing reference APs in the radio communication network are referred to as the non-root timing reference APs. The APs that do not directly derive the reference timing from the external timing reference source are surely the non-root timing reference APs. Some APs that can derive the reference timing from the external timing reference source may also act as the non-root timing reference APs.

The second deriving unit 510 of the non-root timing reference AP 500 derives reference timings from one or more root timing reference APs in the radio communication network. The one or more root timing reference APs derives reference timings from external timing reference sources as described above. When the root timing reference APs propagate the reference timings derived from the external reference sources, the second deriving unit 510 may derive at least one of the reference timings. In an embodiment, the root timing reference APs propagate an absolute timing reference, as such, the second deriving unit 510 may directly receive the absolute timing reference as the reference timing. In another embodiment, the root timing reference APs may propagate a timing reference implicitly via the transmission of the beacon signal or preamble, i.e. the transmitting timing of the beacon signal or preamble actually suggests the reference timing. In this case, after receiving the beacon signal or preamble, the second deriving unit 510 may derive the transmitting timing and evaluate the propagation delay based on the signal or preamble, whereby the reference timing can be obtained. Since such derivations of reference timing are well known in the art, they will not be described in further detail.

The determining unit 520 of the non-root timing reference AP 500 determines a local timing based on the reference timings. In an embodiment, the determining unit 520 may calculate an average of the derived reference timing as its local timing. In another embodiment, the determining unit 520 may obtain signal quality or strength of beacon signals that carry the reference timing, and select a reference timing having the best signal quality or highest strength from the reference timings as its local timing. Here, the signal quality of beacon signals can be measured by the signal to noise ratio (SINR) or jitter. The strength of the beacon signals can be measured by the received power level of the beacon signals.

Through utilizing the reference timing derived from the root timing reference APs to determine the local timing, the non-root timing reference AP 500 can accomplish timing synchronization with the root timing reference APs. In this way, the timing synchronization can be achieved among all the APs in the radio communication network. Furthermore, all the UEs always synchronize with its associated APs. As such, the timing synchronization can be implemented throughout the radio communication network.

Optionally, after the second deriving unit 510 derives the reference timings from one or more root timing reference APs, the non-root timing reference AP 500 may select one or more optimal reference timings from the reference timings according to propagation hops from the one or more root timing reference APs to the non-root timing reference AP.

Typically, the reference timing having the less number of propagation hops is preferred. In an embodiment, the number of the propagation hops can be recorded in a synchronization flag, which is propagated together with the reference timing in the beacon signals. Whenever the reference timing arrives at a next AP, the number of the propagation hops will be incremented by one.

After selecting the optimal reference timings, the non-root timing reference AP 500 may determine the local timing only based on the optimal reference timings. The determination process can be performed as described above.

Optionally, the second deriving unit 510 may derive both the reference timings and priority information of external timing reference sources providing the reference timings from the one or more root timing reference APs. In this case, the second deriving unit 510 may select the reference timings provided by the external timing reference sources having the highest priority as the optimal reference timings. Alternatively, the second deriving unit 510 may also select the optimal reference timings by taking both the propagation hops and the priority information of the external timing reference sources into account.

Optionally, in order to ensure that all the APs in the radio communication network have chance to synchronize with other APs. The non-root timing reference AP 500 may propagate the determined local timing to neighboring APs in the radio communication network. The neighboring APs may include root timing reference APs and other non-root timing reference APs. Upon receiving the local timing originated from the non-root timing reference AP 500, the root timing reference APs are likely to simply ignore it, and other non-root timing reference APs may determine its local timing based on the received local timing in the case that the other non-root timing reference APs don't receive reference timing from any root timing reference APs.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method for implementing timing synchronization performed by one or more root timing reference access points (APs) in a radio communication network comprising, each of the one or more root timing reference APs performing the method comprising the following steps:
   selecting an external timing reference source from different external timing reference sources of separate existing networks, wherein each of the separate existing networks at least partially overlap with the radio communication network;
   deriving a reference timing from the external timing reference source;
   propagating the reference timing to neighboring APs in the radio communication network;
   when a first root timing reference AP of the root timing reference APs receives a reference timing from a second root timing reference AP, comparing, by the first root timing reference AP, a priority of an external timing reference source selected by the first root timing reference AP with that of an external timing reference source selected by the second root timing reference AP; and
   based on determining that the priority of the external timing reference source selected by the second root timing reference AP is higher than the priority of the external timing reference source selected by the first root timing reference AP, determining, by the first root timing reference AP, a local timing based on the reference timing received from the second root timing reference AP, and propagating, by the first root timing reference AP, the local timing to neighboring APs in the radio communication network.

2. The method of claim 1, wherein the selecting step comprises:
   monitoring the separate existing networks to determine signal quality of signals transmitted from the separate existing networks; and
   selecting a separate existing network having higher signal quality than a quality threshold from the separate existing networks as the external timing reference source.

3. The method of claim 2, wherein based on determining that more than one of the separate existing networks have higher signal quality than the quality threshold, selecting a separate existing network with a highest preconfigured priority from the more than one of the separate existing networks as the external timing reference source.

4. The method of claim 1, wherein the propagating step comprises propagating the reference timing and priority information of the external timing reference source to neighboring APs.

5. The method of claim 1, further comprising, for each of the one or more root timing reference APs, before propagating the reference timing to neighboring APs, determining a local timing based on the derived reference timing.

6. The method of claim 1, wherein based on determining that the priority of the external timing reference source selected by the second root timing reference AP is higher than the priority of the external timing reference source selected by the first root timing reference AP, the first root timing reference AP tries to derive a further reference timing from the external timing reference source selected by the second root timing reference AP, and when the first root timing reference AP derives the further reference timing successfully, the first root timing reference AP determines the local timing based on the further reference timing.

7. The method of claim 1, wherein the external timing reference sources selected by the one or more root timing reference APs are different and associated with a different separate existing network of the separate existing networks.

8. A method for implementing timing synchronization performed by one or more non-root timing reference access points (APs) in a radio communication network comprising, each of the one or more non-root timing reference APs performing the method comprising the following steps:
   deriving reference timings from one or more root reference timings received from one or more root timing reference APs in the radio communication network, wherein the one or more root reference timings comprise reference timings derived by the root reference APs from different external timing reference sources of separate existing networks, and wherein the deriving step comprises receiving the one or more root reference timings and priority information of the different external timing reference sources providing the one or more root reference timings from the one or more root timing reference APs;
   selecting, from the derived reference timings, one or more optimal reference timings having a highest priority, wherein each of the optimal reference timings is selected based on the priority information of the external timing reference sources, and based on a number of propagation hops from the one or more root timing reference APs to each of the one or more non-root timing reference APs, and wherein the number of the propagation hops is propagated together with the one or more root timing reference APs in beacon signals; and
   determining a local timing based on the one or more optimal reference timings.

9. The method of claim 8, wherein the determining step comprises calculating an average of the derived reference timings as the local timing.

10. The method of claim 8, wherein the determining step comprises obtaining signal quality or strength of the beacon signals that carry the one or more root reference timings and selecting a reference timing having the best signal quality or highest signal strength from the root reference timings as the local timing.

11. The method of claim 8, wherein the method further comprises propagating the local timing to neighboring APs in the radio communication network.

12. The method of claim 8, wherein the non-root timing reference APs are unable to derive a reference timing directly from the different external timing reference sources of the separate existing networks.

13. A computer program product comprising a non-transitory computer readable storage medium storing instructions which, when run on a processor of a root timing reference access point, AP, cause the root timing reference AP to perform the steps of the method according to claim 1.

14. A computer program product comprising a non-transitory computer readable storage medium storing instructions which, when run on a processor of a non-root timing reference access point, AP, cause the non-root timing reference AP to perform the steps of the method according to claim 8.

15. A root timing reference access point (AP) configured to implement timing synchronization in a radio communication network, the root timing reference AP comprising:
   a processor and a memory, said memory containing instructions executable by said processor to cause said root timing reference AP to perform operations comprising:
   selecting an external timing reference source from different external timing reference sources of separate existing networks, each of the separate existing networks at least partially overlapping with the radio communication network;
   deriving reference timing from the external timing reference source;
   propagating the reference timing to neighboring APs in the radio communication network;
   when a first root timing reference AP of the root timing reference APs receives a reference timing from a second root timing reference AP, comparing, by the first root timing reference AP, a priority of an external timing reference source selected by the first root timing reference AP with that of an external timing reference source selected by the second root timing reference AP; and
   based on determining that the priority of the external timing reference source selected by the second root timing reference AP is higher than the priority of the external timing reference source selected by the first root timing reference AP, determining, by the first root timing reference AP, a local timing based on the reference timing received from the second root timing reference AP, and propagating, by the first root timing reference AP, the local timing to neighboring APs in the radio communication network.

16. A non-root timing reference access point (AP) configured to implement timing synchronization in a radio communication network, the non-root timing reference AP comprising:
   a processor and a memory, said memory containing instructions executable by said processor to cause said non-root timing reference AP to perform operations comprising:
   deriving reference timings from one or more root reference timings received from one or more root timing reference APs in the radio communication network, wherein the one or more root reference timings comprise reference timings derived by the root reference APs from different external timing reference sources of separate existing networks, and wherein the deriving the reference timings from the one or more root reference timings comprises receiving the one or more root reference timings and priority information of the different external timing reference sources providing the one or more root reference timings from the one or more root timing reference APs;
   selecting, from the derived reference timings, one or more optimal reference timings having a highest priority, wherein each of the optimal reference timings is selected based on priority information of the external timing reference sources, and based on a number of propagation hops from the one or more root timing reference APs to each of the one or more non-root timing reference APs, and wherein the number of the propagation hops is propagated together with the one or more root timing reference APs in beacon signals; and
   determining a local timing based on the one or more optimal reference timings.

\* \* \* \* \*